United States Patent
Hay et al.

(10) Patent No.: US 11,288,344 B2
(45) Date of Patent: Mar. 29, 2022

(54) PROTECTING AN APPLICATION VIA AN INTRA-APPLICATION FIREWALL

(71) Applicant: International Business Machines Corporation, Armonk, NY (US)

(72) Inventors: Roee Hay, Singapore (SG); David N. Kaplan, Modi'in (IL); Sagi Kedmi, Raanana (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/436,498

(22) Filed: Jun. 10, 2019

(65) Prior Publication Data

US 2019/0294760 A1 Sep. 26, 2019

Related U.S. Application Data

(63) Continuation of application No. 15/019,252, filed on Feb. 9, 2016, now Pat. No. 10,366,213.

(51) Int. Cl.
*H04L 29/06* (2006.01)
*G06F 21/12* (2013.01)
*G06F 21/62* (2013.01)

(52) U.S. Cl.
CPC ............ *G06F 21/12* (2013.01); *G06F 21/629* (2013.01)

(58) Field of Classification Search
CPC ................................ G06F 21/12; G06F 21/629
USPC .......................................................... 726/23
See application file for complete search history.

(56) References Cited

U.S. PATENT DOCUMENTS

| | | | |
|---|---|---|---|
| 7,730,482 B2* | 6/2010 | Illowsky | G06F 9/4843 717/177 |
| 7,774,620 B1 | 8/2010 | Stott et al. | |
| 7,966,643 B2* | 6/2011 | Nagampalli | H04L 63/1408 726/1 |
| 8,627,490 B2* | 1/2014 | Lim | G06F 21/6227 726/27 |
| 8,893,253 B2 | 11/2014 | Cianfrocca | |
| 9,307,409 B2* | 4/2016 | Sheikh | H04W 24/04 |
| 2004/0199763 A1* | 10/2004 | Freund | H04L 63/104 713/154 |
| 2006/0005193 A1* | 1/2006 | Illowsky | G06F 8/24 718/100 |
| 2010/0083240 A1 | 4/2010 | Siman | |

(Continued)

OTHER PUBLICATIONS

A Comprehensive Approach to Naming and Accessibility in Refactoring Java Programs, Schafer et al, Nov. 2012 (Year: 2012).*

(Continued)

*Primary Examiner* — Jahangir Kabir
(74) *Attorney, Agent, or Firm* — Nathan M. Rau (57) ABSTRACT

One or more communication interfaces of a first application may be scanned. In response to the scanning, it may be determined that at least a first component of the first application is subject to public access from any application. One or more public access features associated with the first component may be removed, wherein the first component is no longer subject to public access from any application. A first module may be added to the first application to control access to data to or from the first component via one or more security rules.

20 Claims, 6 Drawing Sheets

(56) References Cited

U.S. PATENT DOCUMENTS

| | | |
|---|---|---|
| 2012/0304280 A1 | 11/2012 | Hayashida |
| 2012/0311724 A1 | 12/2012 | Mahan et al. |
| 2015/0007259 A1 | 1/2015 | Peterson |
| 2015/0067830 A1 | 3/2015 | Johansson et al. |
| 2015/0089645 A1 | 3/2015 | Vandergeest |
| 2015/0256559 A1 | 9/2015 | Porras |
| 2015/0309813 A1 | 10/2015 | Patel |
| 2015/0373024 A1 | 12/2015 | Zhang et al. |
| 2016/0092348 A1 | 3/2016 | Straub et al. |
| 2016/0344773 A1 | 11/2016 | Knjazihhin et al. |
| 2017/0147338 A1 | 5/2017 | Jackson et al. |
| 2017/0228524 A1 | 8/2017 | Hay et al. |
| 2020/0045047 A1* | 2/2020 | Wu ............... H04L 69/169 |

OTHER PUBLICATIONS

Eddy, N., "Arxan Enhances Mobile Runtime App Self Protection Capabilities," eWeek.com, Posted Dec. 15, 2014, Copyright 2015 QuinStreet Inc., 6 pages, printed on Nov. 18, 2015, http://www.eweek.com/small-business/arxan-enhances-mobile-runtime-app-self-protection-capabilities.html.

Gordon et al., "Information-Flow Analysis of Android Applications in DroidSafe," NDSS '15, Feb. 8-11, 2015, San Diego, CA, USA, Copyright 2015 Internet Society, 16 pages, http://dx.doi.org/10.14722/ndss.2015.23089.

Sasnauskas et al., "Intent Fuzzer: Crafting Intents of Death," WODA+PERTEA '14, Jul. 22, 2014, San Jose, CA, USA, Copyright 2014 ACM, pp. 1-5, http://dx.doi.org/10.1145/2632168.2632169.

Sunu, A., "Prevoty News," News, Prevoty Runtime Application Security, 31 pages, printed on Nov. 15, 2015, http://blog.prevoty.com/news.

Unknown, "Mobile Application Protection," Arxan, © 2015 Arxan Technologies, Inc., 6 pages, printed on Nov. 18, 2015, https://www.arxan.com/products/application-protection/mobile/.

Yagemann, "Intent Firewall—Main Page," Android, 11 pages, printed on Jan. 25, 2016 http://www.cis.syr.edu/~wedu/android/IntentFirewall/.

Yagemann, "Intent Firewall—Revision 2," Android, 11 pages, printed on Jan. 25, 2016 http://www.cis.syr.edu/~wedu/android/IntentFirewall/rev2.html.

Ye et al., "DroidFuzzer: Fuzzing the Android Apps with Intent-Filter Tag," MoMM2013, Dec. 2-4, 2013, Vienna, Austria, Copyright 2013 ACM, 7 pages.

Chin et al., "Analyzing Inter-Application Communication in Android," MobiSys'11, Jun. 28-Jul. 1, 2011, 5 pages, Bethesda, Maryland, Copyright 2011 ACM 978-1-4503-0643-0/11/06.

"IBM Security AppScan Mobile Analyzer," IBM Software, retrieved Oct. 3, 2017, pp. 1-3. http://www-03.IBM.com/software/products/en/appscan-mobile-analyzer.

Zhao et al., "Collaborative reversing of input formats and program data structures for security applications," IEEE, China Communications, Nov. 2014, pp. 135-147.

Hu et al., "File Parsing Vulnerability Detection with Symbolic Execution," IEEE, 2012 International Symposium Software Engineering, Jul. 2012.

Fu et al., "WSSecTool: A Web Service Security Analysis Tool Based on Program Slicing," IEEE, 2012 Eight World.

List of IBM Patents or Patent Applications Treated as Related, Signed Jun. 10, 2019, 2 pages.

\* cited by examiner

PROTECTING AN APPLICATION VIA AN INTRA-APPLICATION FIREWALL

BACKGROUND

This disclosure relates generally to mobile computing devices, and more specifically, to protecting a mobile computing device application via an intra-application firewall.

Various software applications are increasingly available on mobile computing devices (e.g., smart phones, tablets, e-readers, etc.) to meet users' personal and/or business needs. Mobile computing device application communication models promote the development of rich applications to meet these needs. For example, application developers can leverage existing data and services provided by other applications while still giving the impression of a single seamless application. In an example illustration, a restaurant review application can request other applications to display the restaurant's website, provide a map with the restaurant's location, and call the restaurant. This communication model reduces developer burden and promotes functionality reuse. Various mobile computing device operating systems achieve this by dividing applications into components and providing a message passing system so that components can communicate within and across application boundaries.

SUMMARY

One or more embodiments are directed to a computer-implemented method, a system, and a computer program product for building a secure computing device application. One or more communication interfaces of a first application may be scanned. In response to the scanning, it may be determined that at least a first component of the first application is subject to public access from any application. One or more public access features associated with the first component may be removed, wherein the first component is no longer subject to public access from any application. A first module may be added to the first application to control access to data to or from the first component via one or more security rules.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to protecting a mobile computing device application via an intra-application firewall. While the present disclosure is not necessarily limited to such applications, various aspects of the disclosure may be appreciated through a discussion of various examples using this context.

Mobile computing device applications may communicate with each other via message-based interprocess communication (IPC) (or intercomponent communication). For example, application message passing systems allow an application to invoke/call other applications within a mobile computing device in order to pass data to (or read data from) the other applications. In an example illustration, in an ANDROID mobile platform, applications may be allowed to transmit data to one or more activities within a separate application. Activities are user interface (UI) instances, such as UI screens that represent a workflow (or part of a workflow) of an application. Each activity may be configured to either be invoked by another activity within the same workflow or by a different application. Activities may be configured to be "exported" or "non-exported." Exported activities are those activities that cross application boundaries and may be invoked from any separate application(s) such that they are publicly accessible. Non-exported activities are those activities that can only be invoked by other activities within the same workflow or application (e.g., they are not publicly accessible).

Although message passing systems in mobile computing devices allow for rich applications, it is also an application attack surface, particularly for those components that are publicly accessible. The content of messages can be sniffed, modified, stolen, or replaced, which can compromise user privacy. Also, a malicious application can inject forged or otherwise malicious messages, which can lead to breaches of user data and violate application security policies. For example, sensitive or private data (e.g., photographs, phone numbers, passwords, Global Positioning System (GPS) location data, etc.) may be stored to a user's mobile computing device. This sensitive or private data may be accessed via malicious software (e.g., malware) that was, for example, accidently installed on the user's mobile computing device under the guise of a genuine application.

Figure 1:
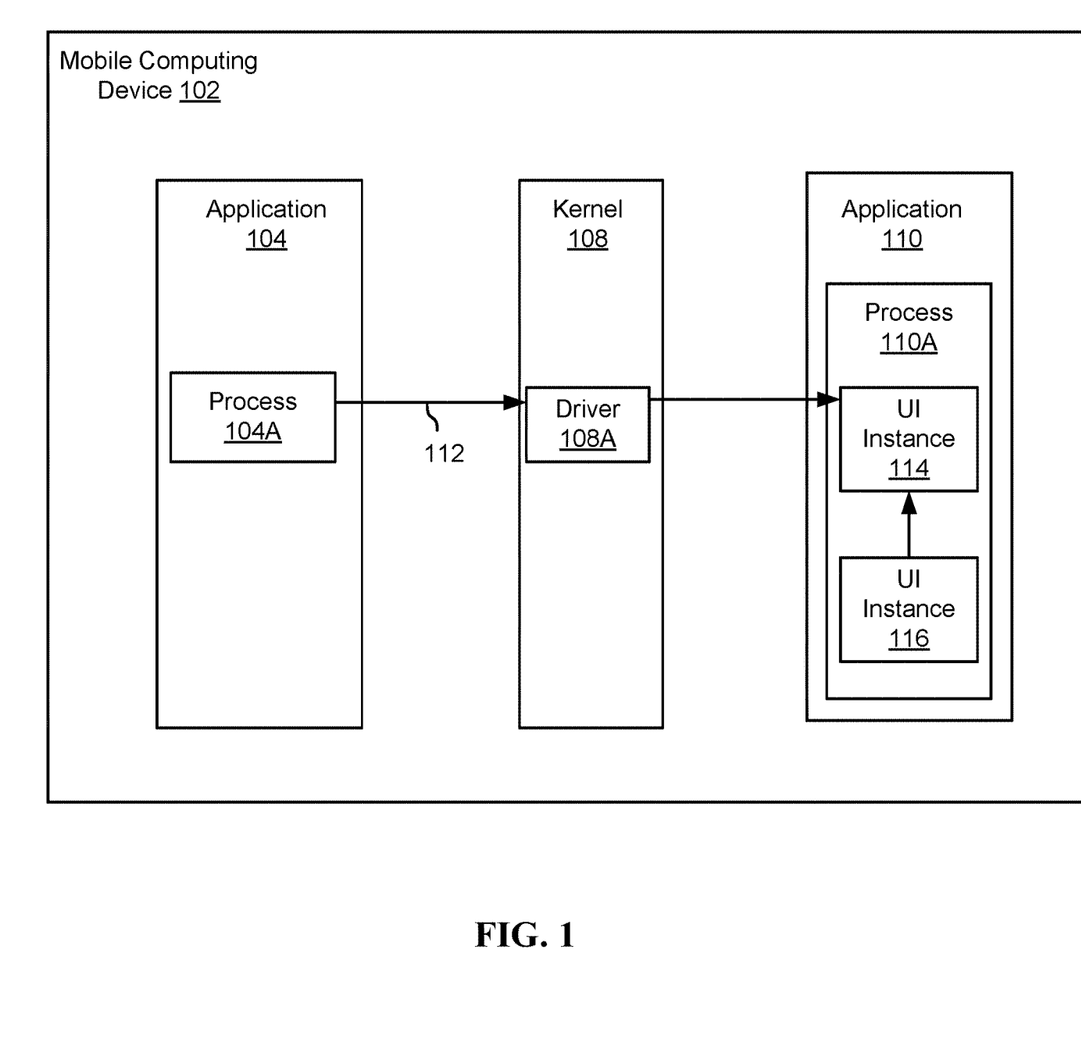
FIG. 1 is a block diagram of a maliciously coded application that injects malicious data into another application via typical interprocessor communication (IPC) protocols.

FIG. 1 is a block diagram of a maliciously coded application 104 that injects malicious data into another application via typical IPC protocols. FIG. 1 illustrates that application 104—a malicious application—may include a process 104A that injects malicious data 112 into the user interface (UI) instance 114 (e.g., an activity). In order for the process 104A to communicate with the application 110, the process 104A may first consult the driver 108A within the kernel 108. The kernel driver 108 (e.g., a Binder driver) utilizes shared memory to facilitate IPC. Shared memory may, for example, be a location in system memory mapped into virtual address spaces of two processes that each process can fully access. The kernel driver 108 may copy transmission data from the process 104A's memory address space to the kernel 108 and then copy the transmission data to the destination process (i.e., process 104A). FIG. 1 illustrates that the malicious data 112 can be passed through the driver 108A and into the process 110A's UI instance 114. Although an application developer may wish to copy or transfer data from UI instance 116 to UI instance 114, the malicious application 104 can also pass malicious data 112 to the UI instance 114, particularly if the UI instance 114 is publicly accessible (e.g., exportable).

Although the kernel driver 108 or other operating system functions may include security mechanisms, these mechanisms may be too restrictive or cumbersome and they may not mitigate the threat of malicious attacks that invoke workflow components (e.g., activities, services, broadcast receivers, etc.). For example, in an ANDROID platform, although particular components may be configured to be non-exported, categorically denying all invocations from all external applications may be unreasonable given the necessary contributions of external applications in order to seamlessly allow an application to function. However, making an application exportable may oppositely allow any and all applications to invoke a component, thereby creating a malicious attack surface. Embodiments of the present disclosure are thus directed to effectively protecting a mobile computing device application during build-time and run-time via an intra-application firewall.

Figure 2:
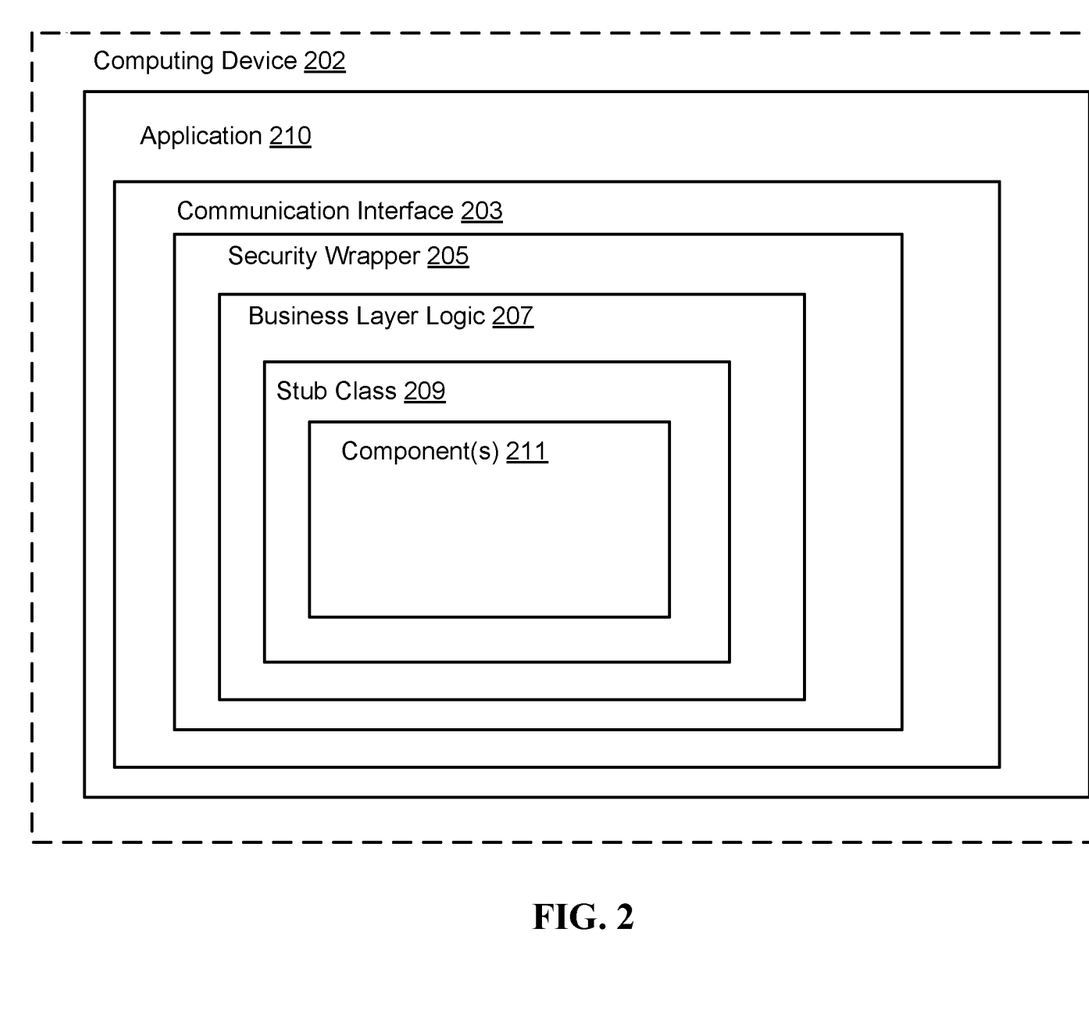
FIG. 2 is a block diagram of a computing device application and a built-in application security wrapper, according to embodiments.

FIG. 2 is a block diagram of a computing device application and a built-in application security wrapper, according to embodiments. The computing device 202 may include an application 210. In some embodiments, the application 210 may include a communication interface 203, a security wrapper 205, business layer logic 207, a stub class 209, and one or more components 211 (e.g., activities). According to some embodiments, FIG. 2 represents the application 210 as it appears at compile time or build time (i.e., the time a developer makes an application). FIG. 2 may also represent the layers of modules that an invocation message must pass through before a data read/write is completed. At run time, each of the components/engines/module within the application 210 may represent program instructions executed by one or more processors and/or stand-alone data stored in computing device memory (e.g., FIG. 6).

The communication interface 203 may be where incoming invocation messages (e.g., intents) are first accepted before the security wrapper 205 analyzes the invocation message. The communication interface 203 (e.g., an entry/input point(s)) may provide information about its application host (e.g., application 210) and the application invoking the application host (e.g., application 104 of FIG. 1). For example, the application 210 may include a manifest file, which documents its inter-component communication (ICC) interfaces. The ICC interfaces may include application 210 information such as which activities are publicly accessible or not (e.g., exported or non-exported). The communication interface 203 may also include information about an incoming invocation message such as the name of the caller (i.e., application) that sends the invocation message, whether the invocation is "implicit" or "explicit," and/or the data sent in the invocation message 212. An "explicit" invocation message is when a particular application invokes a specific application or component to receive the invocation or execute a task. An "implicit" invocation message is when a particular application declares a general desired action (e.g., open a web page) without specifying which application or component should receive the invocation or execute a task.

In some embodiments, at build time, exported activities (or other components) may be renamed in the Manifest and their features (e.g., intent filters) may be removed to effectively nullify the effects of traditional exported activities. For example, if a developer desires that only a particular quantity of exported activities of a set of exported activities needs more robust security, the particular quantity of exported activities may be renamed and their export features may be removed such that those exported activities are no longer categorically exportable, but are only exportable according to a set of rules, which is described in more detail below.

The security wrapper 205 may be configured to analyze an invocation message and depending on the nature of the invocation message when compared against a set of rules, implement a firewall layer (e.g., the firewall 317 of FIG. 3) to control access to the one or more components 211. In some embodiments, the security wrapper 205 may be a module that is added (e.g., generating code) at compile time to control access to data to or from the first component via one or more security rules. In some embodiments, the security wrapper 205 may include or be a routing layer (e.g., marshalling code) that converts higher level application data structures (e.g., request/response parameters) into parcels for the purpose of embedding the parcels into binder transactions. A parcel may be a container for a message or a unit of transactional data that is utilized for communication with a lower layer such as the business layer logic 207. In some embodiments, the security wrapper 205 may include validation and/or sanitization code in order to detect whether there is any malicious code associated with an invocation message and/or whether the invocation message is valid according to a set of rules and route or control the invocation message accordingly. The security wrapper 205 may also map incoming messages to handlers within the business layer logic 207. The security wrapper 205 is described in more detail below.

The business layer logic 207 processes an invocation request (or parcel) and describes business operations. For example, the business layer logic 207 may be an ANDROID Interface Definition Language (AIDL) that generates a proxy class to give an invoking application access to the one or more components 211. The business layer logic 207 may also generate the stub class 209 that may map transactions to component calls.

In some embodiments, a stub may be created for each of the renamed exported activities or other components. Each of the stubs may then be synthesized into the stub class 209 via a singleton module. A singleton module may control object creation by limiting the number of objects to one (e.g., synthesizing the new activity stubs to one stub class identifier). In some embodiments, the stub class 209 may be responsible for handling any invocation of the activity or other component according to a set of predefined rules, as specified in a configuration file by the application developer.

The one or more components 211 may be the logical building blocks of an application that may be invoked to read data from and/or write data to. The one or more components 211 may be any suitable component within mobile computing device applications. For example in an ANDROID platform, the components 211 may be one or more activities, services, broadcast receivers, and content providers. Activities may provide user interfaces and may be started via intents. Activities may also returns data to their invoking components upon completion. All visible portions of applications are activities. Services run in the background, perform work for remote processes, and do not interact with the user. Other components can bind to a service, which lets a binder invoke methods that are declared in the target service's interface. For example, a service might play music in the background while the user is in a different application, or may fetch data over a network without blocking user interaction within an activity. A broadcast receiver receives intents (e.g., normal, sticky, or ordered intents) sent to multiple applications. Broadcast receivers may be triggered by the receipt of an appropriate intent and then run in the background to handle the event. Broadcast receivers may relay messages to activities or services. Content providers are databases addressable by the application defined Uniform Resource Identifiers (URI). Content providers are also used for both persistent internal data storage and as a mechanism for sharing information between applications.

Figure 3:
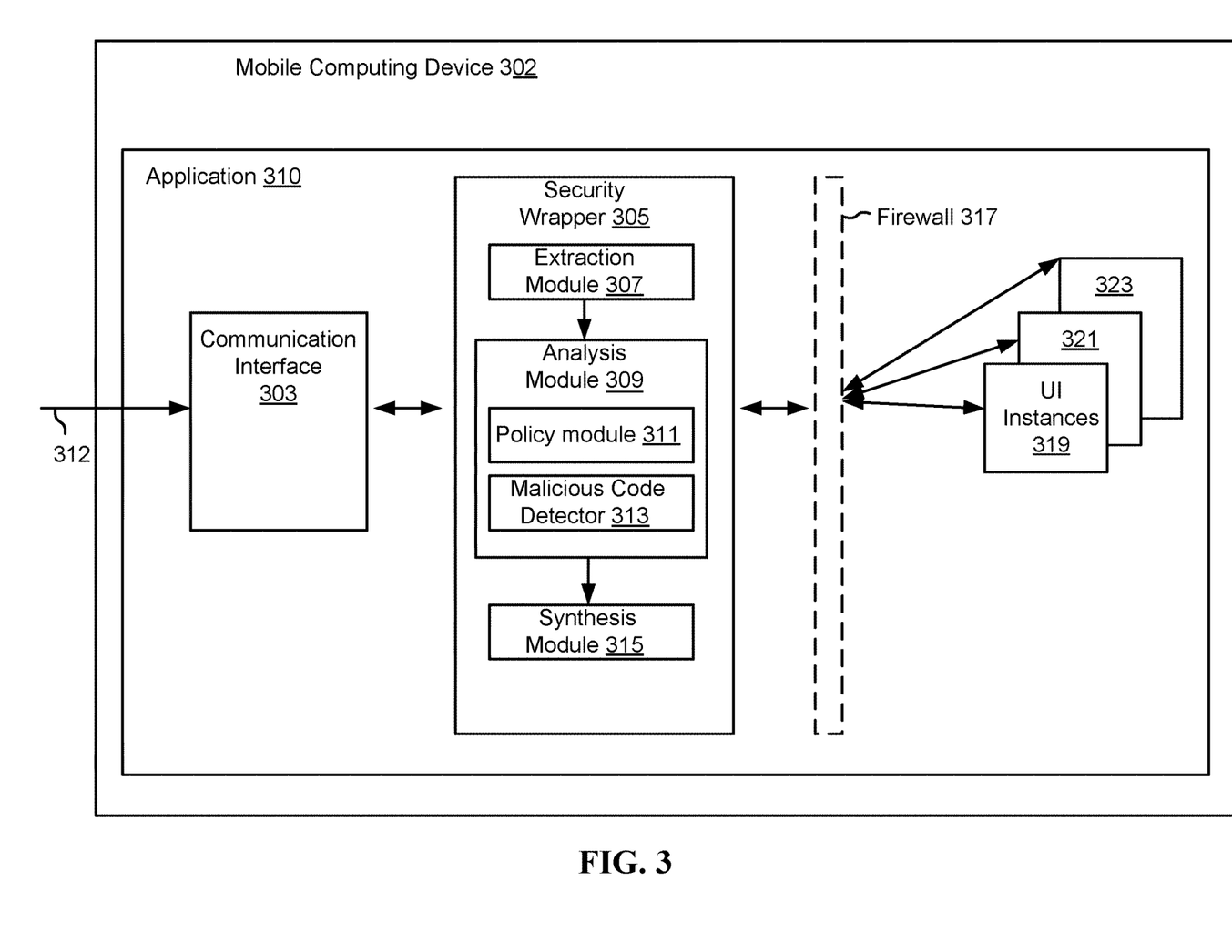
FIG. 3 is a block diagram of a mobile computing device application illustrating how it receives and processes an invocation message, according to embodiments.

FIG. 3 is a block diagram of a mobile computing device application illustrating how it receives and processes an invocation message, according to embodiments. The application 310 may include a communication interface 303, a security wrapper 305, and various UI instances—314A, 314B, and 314C (e.g., activities). In some embodiments, the security wrapper 305 may be the same or analogous to the security wrapper 205 of FIG. 2. The security wrapper 305 may include an extraction module 307, an analysis module 309, and a synthesis module 315. In some embodiments, each of the components/engines/module within the application 310 represent program instructions executed by one or more processors and/or stand-alone data stored in computing device memory (e.g., FIG. 6). FIG. 3 illustrates that the application 310 is securely handling an invocation message 312, which may be from a malicious application. For example, the invocation message 312 may be sent from the malicious application 104 of FIG. 1.

As disclosed herein a "malicious application," a "malicious code," "malware," or the like may refer to code in any part of a software system or script that causes an unauthorized alteration of an application/script/computing device. Examples of malicious code is malware such as injection attacks, viruses, rootkits, spyware, adware, etc. Malicious code may be detected according to various embodiments. For example, anti-malware module may detect malicious code via a signature-based approach, wherein known malware fingerprints/signatures may be stored to a file and compared against an invocation message contents. Further, malicious code may be detected via a heuristic approach, wherein new malicious code may be detected by examining an invocation message for suspicious/anomaly-like characters (e.g., rare instructions or junk code). Malicious code may also be detected via the behavior/execution of an application/computing device (e.g., the unpacking of malcode, modifying components, observing keys strokes, etc.). As disclosed herein to "invoke" or an "invocation message" may refer to first process or application calling a second process or application or a first process or application initiating or starting a function. An invocation message, for example, can include a first malicious application requesting to inject data into one or more components, such as an activity.

FIG. 3 illustrates that an application may invoke application 310, which may include, for example, a maliciously coded application requesting to inject data into the UI instance 314A. In various embodiments, invocation messages may invoke components in addition to or instead of the UI instances 314A, 314B, and 314C (e.g., services, broadcast receivers, etc.) as shown in FIG. 3. In some embodiments, the invocation message 312 may come in the form of an "intent" when an ANDROID platform is utilized. An "intent" is a message that an application developer may utilize within a Java Application Program Interface (API) layer that is sent with a Binder IPC. An intent may be an abstract representation of an operation to be formed by an application and may include an "action" field, a "data" field, and may include information about a caller (e.g., a Uniform Resource Identifier (URI) of the caller). The action field may include data specifying the operation to be performed. The data field may include the data to be passed to the other process. For example, a maliciously coded application may invoke application 310 by passing an intent that specifies to dial (action) a particular phone number (data). In another example, the maliciously coded application may invoke application 310 by passing an intent that specifies to inject (action) data X (i.e., introduce malicious code) into a particular activity, which may alter the course of execution (e.g., Structured Query Language (SQL) injection).

In some embodiments, the security wrapper 305 may be configured to analyze the invocation message 312 and depending on the nature of the invocation message 312 when compared against a set of rules, implement a firewall 317 layer between the UI instances 314A, 314B, and/or 314C in order to control which UI instances may be invoked. In some embodiments, the extraction module 307 may be configured to at least scan the application 310's code and accompanying resources and obtain details of the invocation message 312 via the communication interface 303. For example, in an ANDROID platform, the extraction module 307 may parse the application 310's Manifest file (e.g., via ANDROID Software Development Kit (SDK)) to determine whether the UI instance that the invocation message 312 is querying is exportable or non-exportable. The extraction module 307 may also determine various other matters such as a caller ID of the invocation message 312 to determine which application is sending the message, the data within the intent, and/or whether the invocation message 312 is explicit or implicit. The extraction module 307 may further query any other information in order to determine whether the invocation message 312 violates one or more security rules.

The analysis module 309 may then receive the information from the extraction module 307 to ultimately determine (e.g., via validation/sanitization code) whether there is a security threat associated with the invocation message 312 and decide, according to a set of rules, whether to implement the firewall 317. In some embodiments, the analysis module 309 may utilize a policy module 311 to compare a set of rules against the invocation message 312 to determine whether the firewall 317 should be implemented for the invocation message 312. The policies or rules may be any suitable policy/rule, which is described in more detail below. For example, the policy module 311 may identify a list of allowed callers (i.e., applications) that are allowed to invoke a particular UI instance. The one or more rules may specify that only those callers on the list may invoke the particular UI instance, and if a caller is not on the list, then the firewall 317 may be implemented such that the caller not on the list may not be able to invoke the UI instance. In some embodiments, the rules or policies obtained by the policy module 311 may be stored to a configuration file (e.g., a Manifest file) within the application 310.

In some embodiments, the analysis module 309 may include a malicious code detector 313. The malicious code detector 313 may scan and detect whether the invocation message 312 is associated with malicious code. For example, the malicious code detector 313 may detect whether or not incoming data from an application within an intent corresponds to an SQL injection attack. Depending on whether malicious code is detected, the analysis module 309 may determine whether to allow or block this data based on the results of the scan by the malicious code detector 313.

The synthesis module 315 may take the security threat(s) detected by the analysis module 309 to either route the invocation message 312 to one or more of the UI instances or implement the firewall 317 according to a set of rules. For example, if the malicious code detector 313 detected that the invocation message included malicious code, then the synthesis module 315 may implement the firewall 313 such that the invocation message may not have access to any of the UI instances 214A, 214B, or 214C. In another example, if the caller of the invocation message 312 was recognized by the policy module 311 as a valid caller only for UI instance 214A, the synthesis module 315 may still implement the firewall 317A, which may effectively allow the invocation message 312 to have access to UI instance 214A, but not UI instance 214B or 214C.

Figure 4:
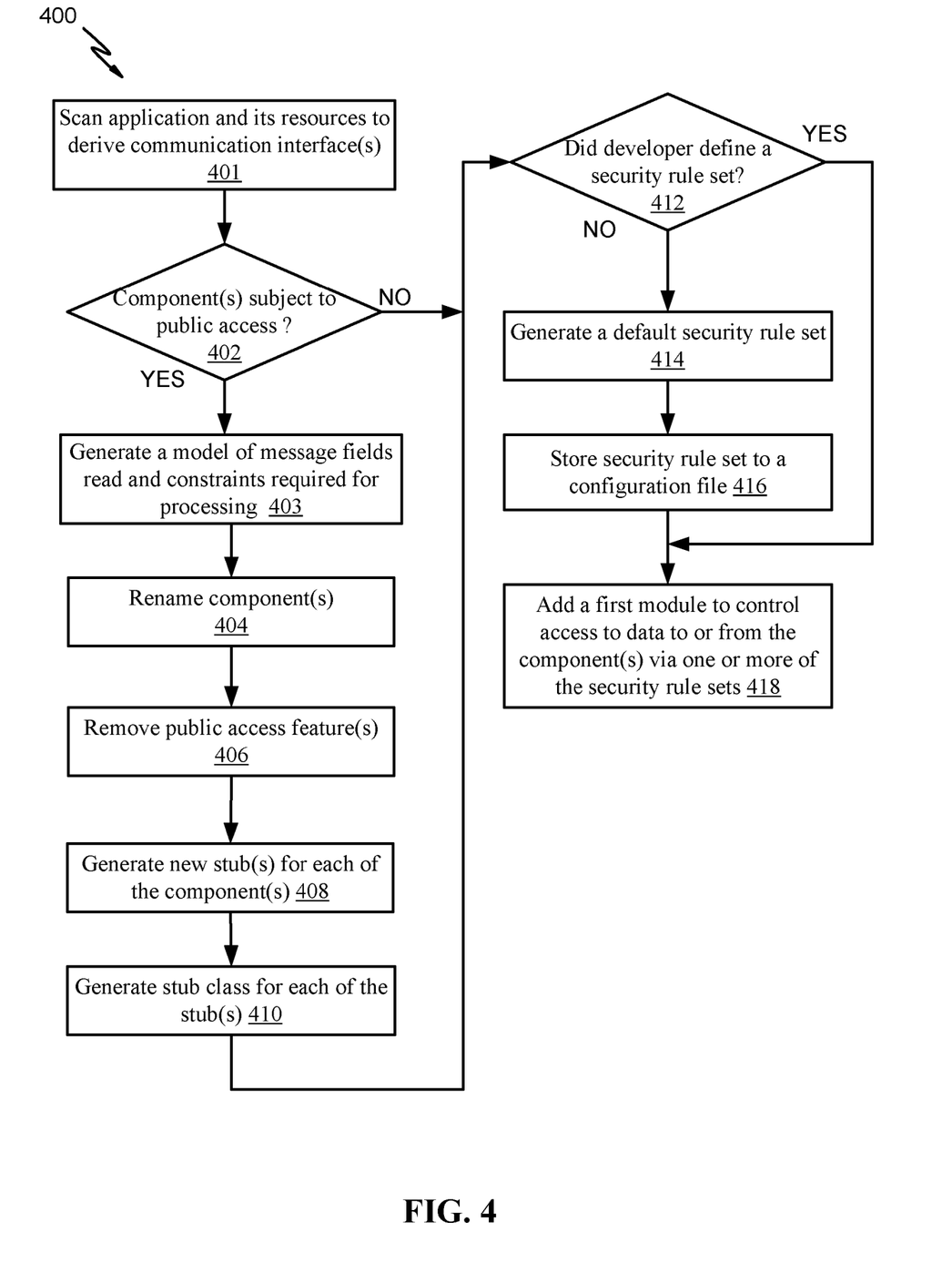
FIG. 4 is a flow diagram of an example process of building a secure mobile computing device application, according to embodiments.

FIG. 4 is a flow diagram of an example process of building a secure mobile computing device application, according to embodiments. FIG. 4 may represent an application in the development process at build time before any invocation messages are received. The process 400 may begin at block 401 when a computing device scans an application and its resources (e.g., its configuration files) to derive one or more communication interfaces. Deriving communication interfaces may be useful to identify and analyze application components and determine whether one or more components are subject to public access (e.g., is exportable).

Per block 402, a computing device determines whether one or more of its application components (e.g., activities, services, etc.) are subject to public access (e.g., are exportable). As described above, the mobile computing device may make this determination by scanning its configuration file (e.g., Manifest) and querying the communication interface (e.g., ICCC) to determine whether the one or more components are subject to public access. If none of the one or more components are subject to public access then the process 400 may continue at block 412.

Per block 403, if any of the one or more components are subject to public access, the computing device may then generate a model of message fields read and constraints required for processing for each public access component in order to develop intra/inter application workflow security rules to filter invocation messages. For example, a particular activity of an application may process X type of data and may receive and utilize a stream or Uniform Resource Locator (URL) (i.e., a message field) to open a web page space. The message field may be analyzed to determine whether the application will allow particular invocations internally within the workflow.

Per block 404, the component(s) subject to public access may be renamed (e.g., via a user request) and their features (e.g., intent filters or other filters) may be removed per block 406 to effectively nullify the effects of traditional public access components (e.g., the previously exported activities are no longer categorically subject to public access).

Per block 408, the computing device may generate one or more stubs for each of the one or more components that were previously subject to public access. A "stub" may be a small routine or function that substitutes for a longer routine or function. The longer routine may be loaded at a later time. Per block 410, the computing device may generate a stub class (e.g., stub class 209 of FIG. 2) for each of the one or more stubs. The stub class may map or route user transactions or route to component calls, depending on a set of security rules.

Per block 412, the computing device may determine whether the developer defined a security rule set. A "security rule set" may be any suitable rule(s) or policy(s) that the computing device utilizes (e.g., via the policy module 311 of FIG. 3) to control or block (e.g., via the firewall 317 of FIG. 3) data read/write to and/or from one or more components. In some embodiments, the determination at block 412 may be made by scanning a configuration file (e.g., a Manifest file) to identify any rule set specified by a user.

Per block 414, if the developer did not define a security rule set, then the computing device may then generate a default security rule set. For example, the computing device may allow all exported activities to be read externally but disallow the transfer of data from the external callers. Per block 416, once the default security rule set of generated, the rule set may then be stored to a configuration file.

Per block 418, a first module may be added to control access to data to or from the component(s) via one or more of the security rules. For example, the first module may be the same or analogous module as specified by the security wrapper 205 of FIG. 2 and/or the security wrapper 305 of FIG. 3.

The security rules set (e.g., utilized by the policy module 311 to implement the firewall 317 of FIG. 3) may include any suitable rule(s) according to various embodiments. Various rules are described below by way of illustration. More or fewer rules may be implemented than described and one or more of the rules may be combined with other rules. In some embodiments the rule set may include a list of callers that are allowed (or not allowed) to invoke particular components. For example, only those applications that are listed in a configuration file may be allowed to invoke one or more components within a particular application. Accordingly, for example, if a particular application is not included on the list, then a firewall (e.g., firewall 317 of FIG. 3) may be implemented such that the particular application may not have access to any of the components for a read/write operation.

In some embodiments, the rule set may include a rule to only allow "explicit" invocations, as opposed to allowing both implicit and explicit invocations. Implicit calls (e.g., invocation messages) may be more of a security risk than explicit calls. Explicit invocations identify the intended or specific recipient application by name, whereas an implicit invocations leave it up to the operating system to determine which application(s) should receive the invocation. An implicit invocation may identify a particular desired action (e.g., within an action field of an intent) to be executed without identifying a specific recipient. For example, a first contacts application may store contact information. When a user clicks on a contact's street address, the first contacts application may need to request another second application to display a map of that location. To achieve this, the first contacts application may send an explicit intent directly to Google Maps™, or it could send an implicit intent that would be delivered to any application that says it provides mapping functionality. Using an explicit intent therefore guarantees that the intent is delivered to the intended recipient, whereas implicit intents allow for late runtime binding between different applications, which is more of a security risk as the recipient of the intent may be associated with a malicious application. A malicious application may intercept an implicit intent by declaring an intent filter with all of the actions, data, and/or categories listed in the intent. The malicious application may then gain access to all of the data in any matching intent.

In some embodiments, the rule set may include a rule that specifies the particular data and/or type of data that can (or cannot) be permitted to be passed and/or read to or from particular components. For example, a rule may specify that a particular caller may only inject particular data X into component Y. Any data that is not data X may be firewalled such that the data cannot be passed into the component Y. In another example, a caller may only inject/read (or not inject/read) particular phrases, words, numbers, alphanumeric characters, symbols, etc. to or from particular components.

In some embodiments, the rule set may include a rule that specifies only a particular application type (e.g., applications that require password authentication) may be permitted to invoke/not invoke another application. For example, a user might download both a highly trusted banking application and a free game application (e.g., a malicious application). If the banking application contains the security wrapper (e.g., security wrapper 305 of FIG. 3), then a rule in the Manifest file may specify that only banking-related applications (e.g., a tax preparation application) may access the data. Accordingly, the free game application will not have access to the banking application, as a firewall would be implemented for any invocations by the free game application.

In some embodiments, the rule set may include one or more intra-application workflow filtering rules. Intra-application workflow filtering rules are those rules that govern workflow within an application itself. For example, an application may itself invoke one or more of its own components and according to a set of rules or the application may only invoke a subset of its components and/or invoke particular components (e.g., activities) in a particular order. A request/invocation message may be blocked, for example, if a particular application invoked a second activity before (or after) invoking a first activity that should have been invoked before (or after) invoking the second activity. Implementing one or more intra-application workflow filtering rules may be useful for protecting a genuine application from malicious outside application attacks. For example, implementing one or more intra-application workflow filtering rules may protect an application from activity and/or service hijacking. In an example illustration, without an intra-application filtering rule, a malicious activity may register to receive another application's implicit intents and the malicious activity is then started in place of the expected activity. However, a genuine application may include an intra-application filtering rule that specifies only a particular quantity of activities within the application itself may be invoked. Accordingly, the workflow within the genuine application may not extend to other activities than those specified by the intra-application filtering rules. Intra-application filtering rules may also be utilized when a genuine application has become infected with malicious code. For example, an application's components may make specified calls to various components within the application in a particular manner before a malicious attack. However, after a malicious attack, these specified calls may not be made and/or be made in a manner inconsistent than before the malicious attack.

In some embodiments, the rule set may include a rule that specifies that only a particular operation(s) (e.g., read, write, actions within an intent) are allowed to be performed to particular components. For example, a rule may specify that only certain data within particular components may be read. Therefore, any request to write, update, delete, or otherwise modify data to the one or more components may be firewalled.

In some embodiments, the rule set may specify implementing one or more rules based on a time of day/night and/or a particular date. For example, certain callers may not be able to send an invocation message between 9 p.m. and 5 a.m. to particular components, but may be able to do so between 5:01 a.m. and 8:59 p.m. In another example, implicit calls may only be made on a particular first set of dates, but not on a second set of dates.

In some embodiments, the rule set may specify implementing one or more rules based on the component type being invoked within the application and/or the component type invoking the application. For example, one component may allow read operations while another component may allow write operations. This may be useful in cases such as attempted malicious service launches. If a service is publicly accessible (e.g., exported) and not protected with strong permissions, then any application can start and bind to the service. Depending on the duties of a particular service, it may leak information or perform unauthorized tasks. Services, however, may typically rely on input data more heavily than activities, for example. Consequently, a malicious launch attack where an intent contains data is more likely to put a service at risk than other components. Accordingly, service components may be subject to more rule restrictions regarding data injections.

In various embodiments, the security rule set may be dynamically updated or patched after it has been created by the developer and/or application at build time. For example, a server computing device service may inject new policies into an application by connecting to a mobile computing device application via a Transmission Control Protocol/Internet Protocol (TCP/IP) wireless connection. The rule sets injected by the server computing device may be updating, modifying, and/or deleting one or more previous rule sets generated at build time.

Figure 5:
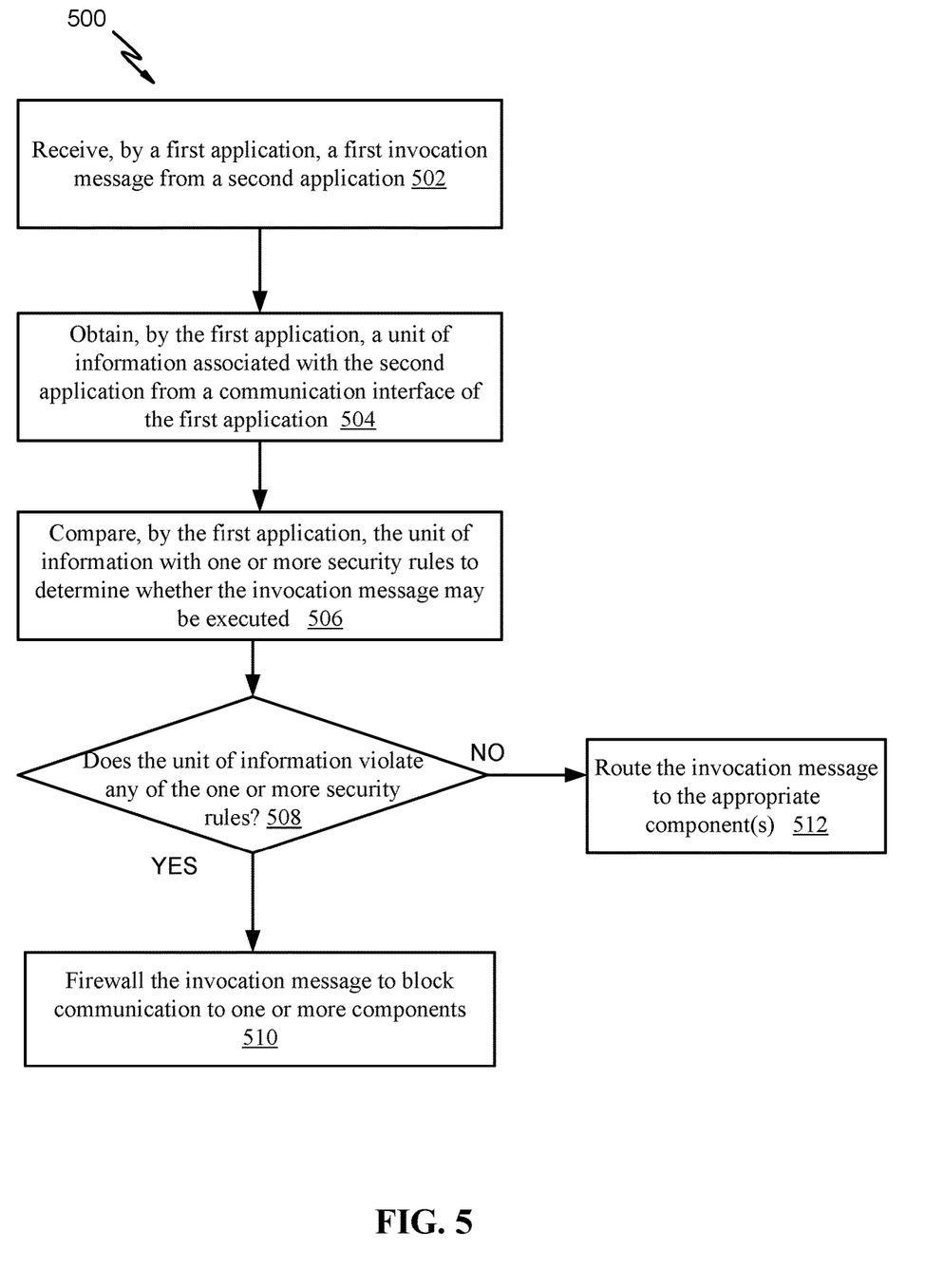
FIG. 5 is a flow diagram of an example process for determining whether a particular application may invoke another application at run time according to one or more rules, consistent with embodiments.

FIG. 5 is a flow diagram of an example process for determining whether a particular application may complete and invocation message with another application at run time according to one or more rules, consistent with embodiments. The process 500 may begin at block 502 when a first application within a mobile computing device receives a first invocation message (e.g., an intent) from a second application. In some embodiments, the first and second application may be within the same mobile computing device. In alternative embodiments, the second application is not necessarily within the same mobile computing device, but within a remote or separate computing device. The first invocation message may include one or more requests such as requesting to access (e.g., read) a set of data within a component (e.g., activity) of the first application or requesting to inject (e.g., write) a set of data within a component. In various embodiments, computing devices need not be "mobile computing devices."

Per block 504, the first application may then obtain (e.g., via the extraction module 307 of FIG. 3) a unit of information (e.g., a set of details) associated with the second application (or operation (e.g., read or write) of the second application) from a communication interface (e.g., communication interface 303 of FIG. 3) of the first application. For example, the first application may query a Manifest file and determine the caller ID of the second application, the second application type, whether the invocation message is explicit or implicit, the data within the invocation message, the operation request (e.g., write, read), etc.

Per block 506, the first application may then compare (e.g., via analysis module 309 of FIG. 3) the unit of information against one or more security rules (e.g., the one or more security rule sets/default rule sets that a developer or application generated at build time per block 412 or 414 of FIG. 4) to determine whether the invocation message may be executed or completed (i.e., routed to the appropriate component(s)). For example, the unit of information may include a caller ID (e.g., the name of the second application), and the one or more security rules may specify only callers specified in a list may invoke the components of the first application. The caller ID of the second application may thus be compared to the allowed callers on the list.

Per block 508, the first application may then determine (e.g., via the analysis module 309) whether the unit of information violates any of the one or more security rules. Using the illustration above, for example, if the caller ID of the second application is not located on the list, then it may mean that the second application is not allowed to invoke any of the components. Therefore, the unit of information may violate this security rule. Accordingly, if the unit of information violates any of the one or more security rules then the first application may firewall (e.g., via the synthesis module 315 of FIG. 3) the invocation message to block communication to one or more components (e.g., the firewall 317 of FIG. 3). In some embodiments, each component within the first application may be blocked from the invocation message. Alternatively, a subset of the components may only be blocked from the invocation message according to the one or more security rules. For example, using the illustration above, the caller ID of the second application may be listed for allowed callers for a first component, but not a second component within the first application. Accordingly, the invocation message may be routed to the first component but firewalled or blocked from being executed against the second component.

Per block 512, if the unit of information does not violate any of the one or more security rules, then the first application may route (e.g., via the synthesis module 315 of FIG. 3) the invocation to the appropriate one or more components (e.g., the component(s) that the invocation message specified in an intent).

Figure 6:
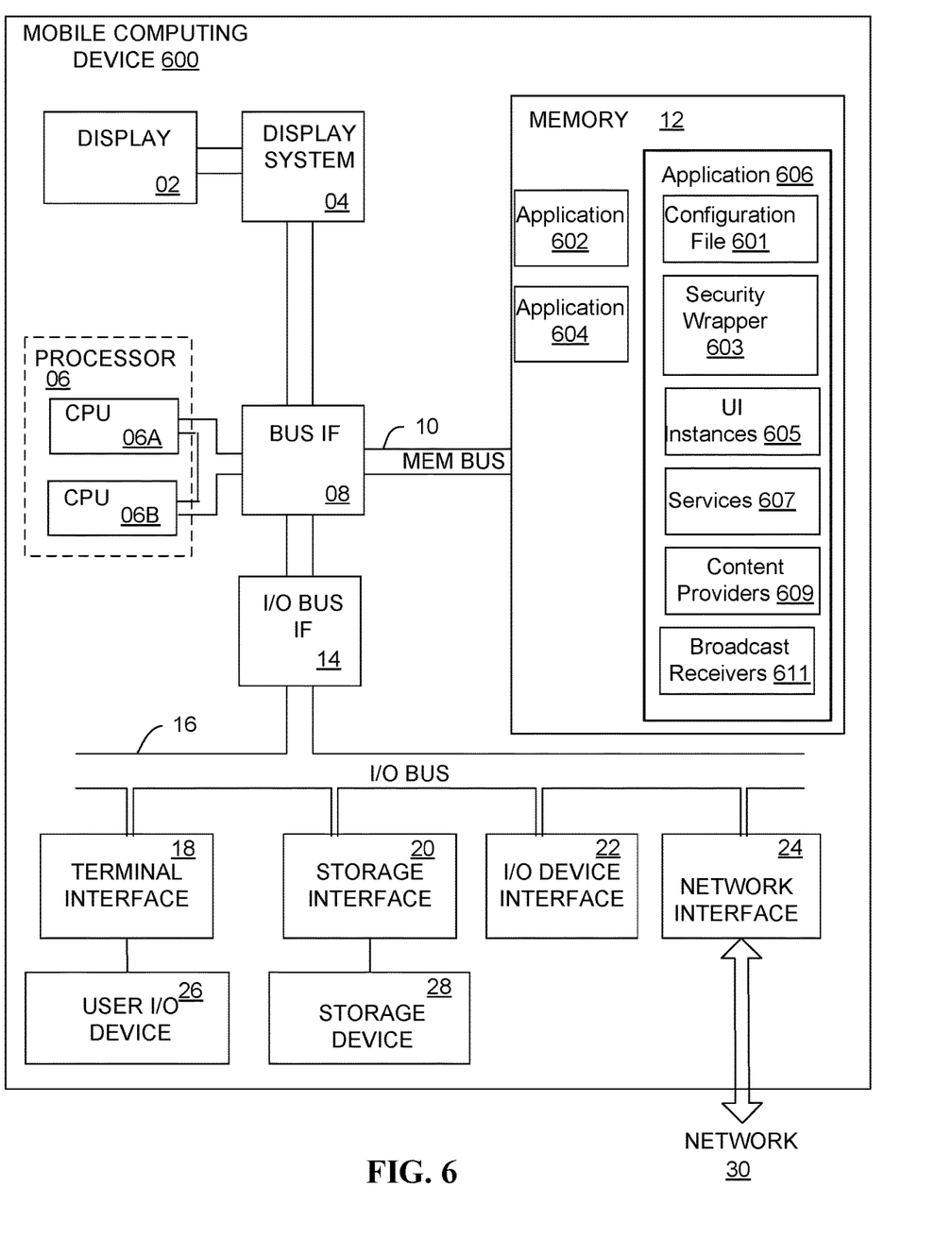
FIG. 6 is a block diagram of a mobile computing device that includes a security wrapper, according to embodiments.

FIG. 6 is a block diagram of a mobile computing device 600 that includes a security wrapper 603, according to embodiments. In some embodiments, FIG. 6 may be or represent any computing device, as opposed to the mobile computing device 600. The components of the mobile computing device 600 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The mobile computing device 600 may include one or more general-purpose programmable central processing units (CPUs) 06A and 06B, herein generically referred to as the processor 06. In an embodiment, the mobile computing device 600 may contain multiple processors; however, in another embodiment, the mobile computing device 600 may alternatively be a single CPU device. Each processor 06 executes instructions stored in the memory 12 (e.g., functions of the security wrapper 603).

The mobile computing device 600 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the mobile computing device 600, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which may be rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The I/O device interface 22 provides an interface to any of various other I/O devices or devices of other types, such as printers or fax machines. The network interface 24 provides one or more communication paths from the mobile computing device 600 to other digital devices and computer systems.

Although the mobile computing device 600 shown in FIG. 6 illustrates a particular bus structure providing a direct communication path among the processors 06, the memory 12, the bus interface 08, the display system 04, and the I/O bus interface unit 14, in alternative embodiments the mobile computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the mobile computing device 600, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

A "mobile computing device" as disclosed herein may be a computing device that is not constrained in its location as a desktop or data center is. Mobile computing devices may be portable or moveable and establish wireless connections (e.g., TCP/IP) to other devices without having to be connected via a fixed physical link (e.g., a wire). Examples of mobile computing devices include a smart phone, portable computer, a handheld computing device, a laptop or notebook computing device, a tablet computing device, a pocket computing device, a smart television, and/or any other suitable type of mobile electronic computing device. Operating systems or platforms associated with the mobile computing device may include any suitable operating system or platform such as: ANDROID, I-PHONE OPERATING SYSTEM (iOS), WINDOWS PHONE 7 (WP7), etc. ANDROID operating systems may include a Linux kernel.

In an embodiment, the memory 12 may include a random-access semiconductor memory, storage device, or storage medium (either volatile or non-volatile) for storing or encoding data and programs. In another embodiment, the memory 12 represents the entire virtual memory of the mobile computing device 600, and may also include the virtual memory of other computer systems coupled to the mobile computing device 600 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the application 606) shown in FIG. 6. These programs and data are illustrated in FIG. 6 as being included within the memory 12 in the mobile computing device 600; however, in other embodiments, some or all of them may be on different computer systems and may be accessed remotely, e.g., via a network 30. The mobile computing device 600 may use virtual addressing mechanisms that allow the programs of the mobile computing device 600 to behave as if they only have access to a large, single storage entity instead of access to multiple, smaller storage entities. Thus, while the components and data shown in FIG. 6 are illustrated as being included within the memory 12, these components and data are not necessarily all completely contained in the same storage device at the same time. Although the components and data shown in FIG. 6 are illustrated as being separate entities, in other embodiments some of them, portions of some of them, or all of them may be packaged together.

In some embodiments, the memory 12 may include program instructions, components, and/or modules, such as application 602, 604, and 606. Application 606 may include a configuration file 601, a security wrapper 603 (which may be the same or analogous to the security wrapper 205 and/or 305 of FIGS. 2 and 3 respectively), UI instances 605 (e.g., activities), services 607, content providers 609, and broadcast receivers 611. In some embodiments, each of the modules and data within the application 606 may also be included in the applications 602 and/or 604. The configuration file 601 may include one or more communication interfaces or entry points and one or more security rules to determine whether a particular invocation message from an application (e.g., application 602) may be executed. The components and data shown in FIG. 6 may include instructions or statements that execute on the processor 06 or instructions or statements that are interpreted by instructions or statements that execute on the processor 06 to carry out the functions as described above.

In another embodiment, the components/modules/data shown in FIG. 6 may be implemented in hardware via semiconductor devices, chips, logical gates, circuits, circuit cards, and/or other physical hardware devices in lieu of, or in addition to, a processor-based system. In an embodiment, the components shown in FIG. 6 may include static data (e.g., security rules) in addition to instructions or statements.

FIG. 6 is intended to depict representative components of the mobile computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for building a secure computing device application, the method comprising:
    scanning one or more communication interfaces of a first application;
    determining, in response to the scanning, that at least a first component of the first application is subject to public access from any other application;
    renaming the at least the first component;
    removing one or more public access features associated with the first component where the effects of traditional public access is nullified by adding a stub in place of the one or more public access features, wherein the first component is no longer subject to public access from any other application; and
    adding, to the first application, a first module to control access to data to or from the first component via one or more security rules, wherein the scanning, the determining, the removing, and the adding are performed by a first computing device at compile time.

2. The method of claim 1, wherein the first application is executed on a mobile device and the first application receives a first invocation message from a second application executing on the mobile device, the first invocation message requesting to write a first set of data to the first component, the first module causes the first application to:
    obtain a first set of details associated with the write;
    compare the first set of details with the one or more security rules to determine whether the write may occur; and
    restrict, based on at least the one or more security rules, the first invocation message by blocking the write of the first set of data to the first component.

3. The method of claim 2, wherein the first module causes the first application to further determine that the first invocation message from the second application is associated with an unauthorized injection attack, wherein the restricting is further based on the determining.

4. The method of claim 1, wherein the first application includes a list of particular applications that are allowed to call the first application, and wherein a first rule of the one or more security rules is based on the list of particular applications that are allowed to call the first application.

5. The method of claim 1, wherein a first rule of the one or more security rules permits a first set of data to be injected to the first component, the one or more security rules including a second rule to block a second set of data to be injected to the first component.

6. The method of claim 1, wherein the first application is managed by an Android operating system.

7. The method of claim 1, wherein the one or more security rules includes a first rule to permit a second application to read the data from the first component, the one or more security rules including a second rule to block the second application from writing any of the data to the first component.

8. A system for building a secure computing device application, the system comprising:
a computing device having a processor; and
a computer readable storage medium having program instructions embodied therewith,
the program instructions executable by the processor to cause the system to:
scan one or more communication interfaces of a first application;
determine, in response to the scanning, that at least a first component of the first application is subject to public access from any other application;
remove one or more public access features associated with the first component, where the effects of traditional public access is nullified by adding a stub in place of the one or more public access features, wherein the first component is no longer subject to public access from any other application; and
add, to the first application, a first module to control access to data to or from the first component via one or more security rules, wherein the scan, the determine, the remove, and the add are performed by a first computing device at compile time.

9. The system of claim 8, wherein the first application is executed on a mobile device and the first application receives a first invocation message from a second application executing on the mobile device, the first invocation message requesting to read a first set of data from the first component, the first module causes the first application to:
obtain a first set of details associated with the read;
compare the first set of details with the one or more security rules to determine whether the read may occur; and
restrict, based on at least the one or more security rules, the first invocation message by blocking the read of the first set of data from the first component.

10. The system of claim 8, wherein a first rule of the one or more security rules permits any explicit invocations to be sent from the first application, the first rule not permitting any implicit invocations to be sent from the first application, the explicit invocations identifying a specific recipient application by name, the implicit invocations identifying a particular action to be executed without identifying a particular recipient application by name.

11. The system of claim 8, wherein a first rule of the one or more security rules permits a first set of data to be read from the first component, the one or more security rules including a second rule to block a second set of data to be read from the first component.

12. The system of claim 8, wherein the one or more security rules includes a first rule that only particular application types are permitted to read from the first component or write to the first component.

13. The system of claim 8, wherein the one or more security rules includes a first rule to permit a second application to write a first set of data to the first component, the one or more security rules including a second rule to block the second application from writing a second set of data to the first component.

14. The system of claim 8, wherein the first application includes a plurality of components, the one or more security rules includes a first rule to permit the first component to invoke a second component only after the first component invokes a third component, the plurality of components including: the first component, the second component, and the third component.

15. A computer program product for building a secure computing device application, the computer program product comprising a computer readable storage medium having program code embodied therewith, the program code comprising computer readable program code configured for:
scanning one or more communication interfaces of a first application;
determining, in response to the scanning, that at least a first component of the first application is subject to public access from any other application;
removing one or more public access features associated with the first component, where the effects of traditional public access is nullified by adding a stub in place of the one or more public access features, wherein the first component is no longer subject to public access from any other application; and
adding, to the first application, a first module to control access to data to or from the first component via one or more security rules, wherein the scanning, the determining, the removing, and the adding are performed by a first computing device at compile time.

16. The computer program product of claim 15, wherein the first application is executed on a mobile device and the first application receives a first invocation message from a second application, the first invocation message requesting to write a first set of data to the first component, the first module causes the first application to:
obtain a first set of details associated with the write;
compare the first set of details with the one or more security rules to determine whether the write may occur; and
restrict, based on at least the one or more security rules, the first invocation message by blocking the write of the first set of data to the first component.

17. The computer program product of claim 15, wherein the first application includes a list of particular applications that are allowed to call the first application only at a particular time of day or night, and wherein a first rule of the one or more security rules is based on the list of particular applications that are allowed to call the first application only at a particular time of day or night.

18. The computer program product of claim 15, wherein the first application includes a second component, the one or more security rules including a first rule that permits a write to the first component, the first rule not permitting a write to the second component.

19. The computer program product of claim 15, wherein the one or more security rules includes a first rule that only a first set of data may be read from the first component, the security rules including a second rule that a second set of data may not be read from the first component.

20. The computer program product of claim 15, wherein a first rule of the one or more security rules permits any explicit invocations to be sent from the first application, the first rule not permitting any implicit invocations to be sent from the first application, the explicit invocations identifying a specific recipient application by name, the implicit invocations identifying a particular action to be executed without identifying a particular recipient application by name.

* * * * *